(12) United States Patent
Tchoryk et al.

(10) Patent No.: US 6,742,745 B2
(45) Date of Patent: Jun. 1, 2004

(54) AUTONOMOUS SATELLITE DOCKING SYSTEM

(75) Inventors: Pete Tchoryk, Ann Arbor, MI (US); Jane Pavlich, Ann Arbor, MI (US); Greg Ritter, Hamburg, MI (US); Anthony B. Hays, Howell, MI (US)

(73) Assignee: Michigan Aerospace Corporation, Ann Arbor, MI (US)

( * ) Notice: Subject to any disclaimer, the term of this patent is extended or adjusted under 35 U.S.C. 154(b) by 0 days.

(21) Appl. No.: 10/286,192

(22) Filed: Nov. 1, 2002

(65) Prior Publication Data

US 2003/0127568 A1 Jul. 10, 2003

Related U.S. Application Data

(60) Provisional application No. 60/335,563, filed on Nov. 1, 2001.

(51) Int. Cl.$^7$ ................................................. B64G 1/64
(52) U.S. Cl. ......................................... 244/161; 294/82.28
(58) Field of Search ............................. 244/135 A, 161, 244/115, 116; 294/82.28

(56) References Cited

U.S. PATENT DOCUMENTS

| | | | | |
|---|---|---|---|---|
| 3,009,729 A | * | 11/1961 | Eakin ...................... | 294/82.28 |
| 3,201,065 A | * | 8/1965 | Dunn ....................... | 244/161 |
| 3,389,877 A | * | 6/1968 | Huber et al. ............ | 244/158 R |
| 3,478,986 A | * | 11/1969 | Fogarty ................... | 244/159 |
| 3,508,723 A | * | 4/1970 | Warren et al. .......... | 244/161 |
| 4,119,051 A | * | 10/1978 | Orndorff, Jr. ........... | 244/161 |
| 4,177,964 A | * | 12/1979 | Hujsak et al. .......... | 244/161 |
| 4,195,804 A | * | 4/1980 | Hujsak et al. .......... | 244/161 |
| 4,381,092 A | * | 4/1983 | Barker .................... | 244/161 |
| 4,573,725 A | * | 3/1986 | Griffiths ................. | 294/82.28 |
| 5,735,488 A | * | 4/1998 | Schneider ............... | 244/161 |
| 6,299,107 B1 | * | 10/2001 | Kong et al. ............. | 244/161 |

* cited by examiner

*Primary Examiner*—Galen L. Barefoot
(74) *Attorney, Agent, or Firm*—Clifford, Krass, Groh, Sprinkle, Anderson & Citkowski, P.C.

(57) ABSTRACT

This invention solves problems associated with prior-art soft-dock mechanisms by placing all active components of a soft-dock system on the chaser side of the mechanism, leaving the target side of the mechanism completely passive (i.e., requiring no power expenditure or self-actuated moving parts to operate). In particular, the active components are supported on the end of a flexible cable attached to the probe, or chaser, side of the device. These components act as a sort of spring-loaded "trap." Once the end of the probe passes into a receptacle on the target side, the mechanism is triggered, engaging it in such a way that it can no longer be pulled out of the receptacle until it is reset.

4 Claims, 10 Drawing Sheets

AUTONOMOUS SATELLITE DOCKING SYSTEM

REFERENCE TO RELATED APPLICATION

This application claims priority from U.S. Provisional Patent Application Serial No. 60/335,563, filed Nov. 1, 2001, the entire content of which is incorporated herein by reference.

FIELD OF THE INVENTION

This invention relates generally to spacecraft docking and, in particular, to a system of the type wherein all active components are disposed on a chase vehicle.

BACKGROUND OF THE INVENTION

There is interest in commercial uses of outer space, particularly earth orbit. This environment offers unique characteristics, such as zero gravity and unlimited vacuum, which may be useful to certain manufacturing processes. A major problem is the costs in launch and recovery of payloads.

One possible solution involves the use of a semi-permanent orbiting vehicle that is periodically serviced for refueling, resupply, and payload exchange. The most economical approach to such operations involves unmanned, unsupervised, autonomous rendezvous and docking vehicles. This requires capture and docking mechanisms which are simple and reliable, even in the presence of some misalignment. It would also be advantageous for the mechanism aboard the normally orbiting craft to be largely passive, thereby preserving power resources for other, perhaps more critical uses.

Existing spacecraft coupling structures typically take the form of compatible male and female devices, such as a conical seating platform on one vehicle and a docking adapter on the other for alignment and coupling of the spacecraft. Such structures typically absorb the relative kinetic energy between the two space vehicles upon engagement, and upon coupling, rigidly and securely interconnect the two spacecraft until their desired disengagement or decoupling.

In most applications, attachment is accomplished by remotely controlling one spacecraft on earth. The controlled vehicle typically includes an elongate probe or grappling arm for insertion into the conical seating platform in the other vehicle. U.S. Pat. Nos. 5,735,488; 5,364,046; 4,177,964; 4,195,804; 4,391,423; and 4,588,150, and Japanese Patent No. 226,497 are illustrative of such structures.

The apparatus described in U.S. Pat. No. 5,735,488 includes an elongate grappling arm extending from a first space vehicle. A pair of inflatable bladders are positioned about the grappling arm for engaging an inner surface of the combustion chamber of a second vehicle upon inflation, and a pair of rear bladders are positioned about the grappling arm for engaging an inner surface of the nozzle downstream from the combustion chamber upon inflation. This aligns the grappling arm and the rocket propulsion nozzle. A pressurized fluid source is provided on the first space vehicle for supplying fluid pressure to the inflatable bladders, and a fluid control valve manifold selectively controls the release of pressurized fluid to the bladders. In operation, the grappling arm is inserted into the rocket propulsion nozzle, and the control valves are actuated to first inflate the front bladders and thereby interconnect the grappling arm and the rocket propulsion nozzle. The rear bladders are subsequently inflated to align a central axis of the grappling arm with a central axis of the rocket propulsion nozzle. Inflation of the rear bladders provides an axial reaction load to balance the axial load provided by the front bladders. Attaching the vehicles in space may be controlled from the earth by activating the control valves to inflate the bladders.

According to U.S. Pat. No. 5,364,046, a largely passive capture mechanism disposed on a first spacecraft includes a concave cone section with the narrower interior end to admit a ball of a predetermined diameter. When tripped, a capture device restricts the diameter of passage for capture of the ball. In the release position passage for the ball is unrestricted. The capture device is preferably reset by the other spacecraft to release the ball. A docking mechanism disposed on the second spacecraft includes a convex cone section constructed to mate with the concave cone section, ball at the end of a cable and a boom. The cable may be extended from or retracted to the apex of the convex cone section. A rotary drive coupled to the convex cone section permits relative rotation of the spacecraft. The boom may be extended from or retracted into the second spacecraft. The spacecraft dock by directing the extended ball into the cylinder, where it is captured. The cable and boom retract to dock. The active docking mechanism releases and resets the capture device to undock. A pyrotechnic cutter disposed inside the boom can cut the cable for emergency release.

SUMMARY OF THE INVENTION

This invention solves problems associated with prior-art soft-dock mechanisms by placing all active components of a soft-dock system on the chaser side of the mechanism, leaving the target side of the mechanism completely passive (i.e., requiring no power expenditure or self-actuated moving parts to operate). In particular, the active components are supported on the end of a flexible cable attached to the probe, or chaser, side of the device. These components act as a sort of spring-loaded "trap." Once the end of the probe passes into a receptacle on the target side, the mechanism is triggered, engaging it in such a way that it can no longer be pulled out of the receptacle until it is reset.

DETAILED DESCRIPTION OF THE INVENTION

The invention will now be described in detail with reference to the Figures, using the following definitions:

Chaser—The half of a docking mechanism that is attached to the satellite that is performing the servicing operation, or chase vehicle;

Target—The half of a docking mechanism that is attached to the satellite that is being serviced, or target vehicle;

Soft-Dock—The capture of the target vehicle by the chase vehicle by a method that imparts little or no force on the target vehicle. This is in contrast to hard-dock which nominally involves a collision between parts of the chaser and target vehicles. Hard-dock procedures generally impart a great deal of force on the target spacecraft, which can push it away before the docking mechanism is fully engaged;

Harpoon—The end effector used by the chase vehicle to capture the target vehicle;

ARD—The autonomous rendezvous and docking mechanism described in U.S. Pat. No. 5,364,046;

ASDS—The autonomous satellite docking system according to the present invention, which includes the Harpoon end effector.

Figure 1:
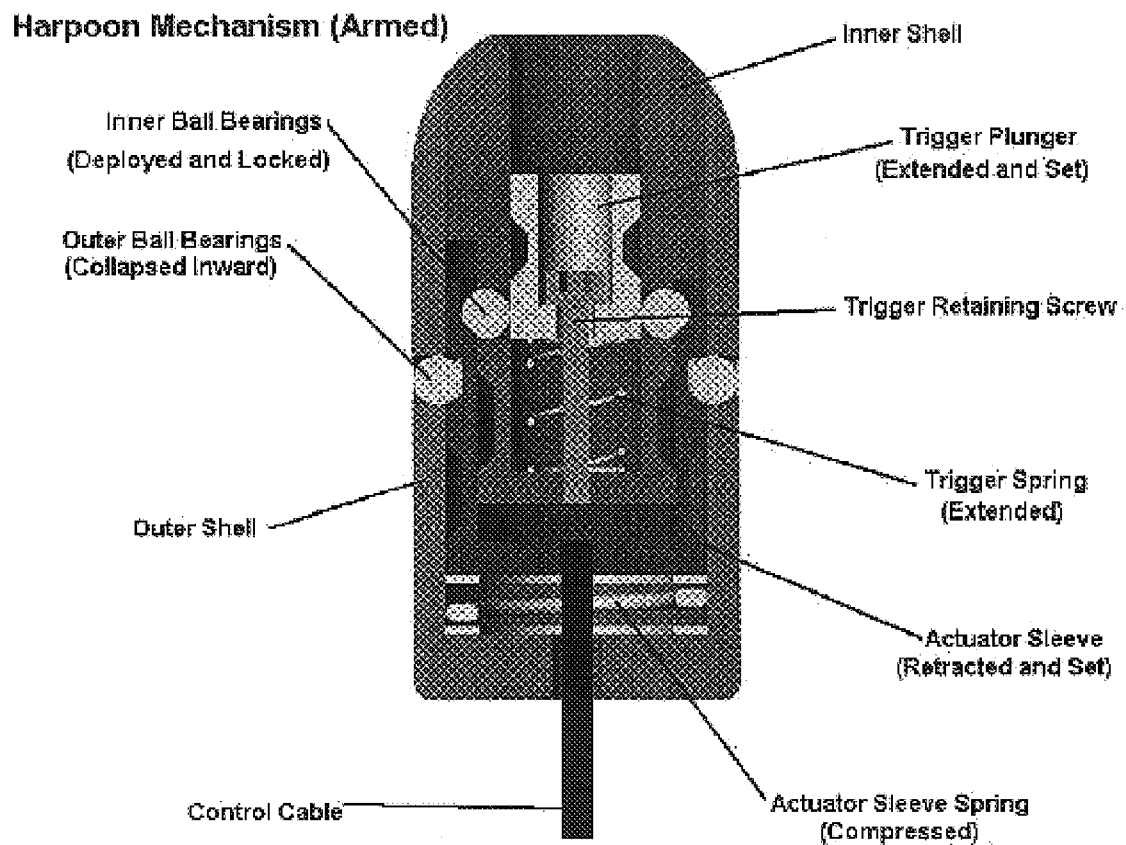
FIG. 1 illustrates the Harpoon Capture Mechanism (Armed)
Figure 2:
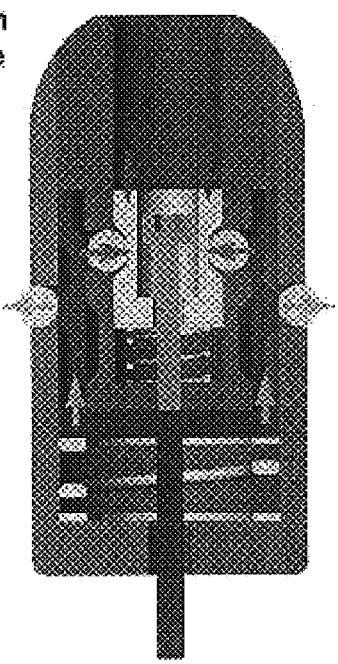
FIG. 2 illustrates the Harpoon Capture Mechanism Actuation Sequence.
Figure 3:
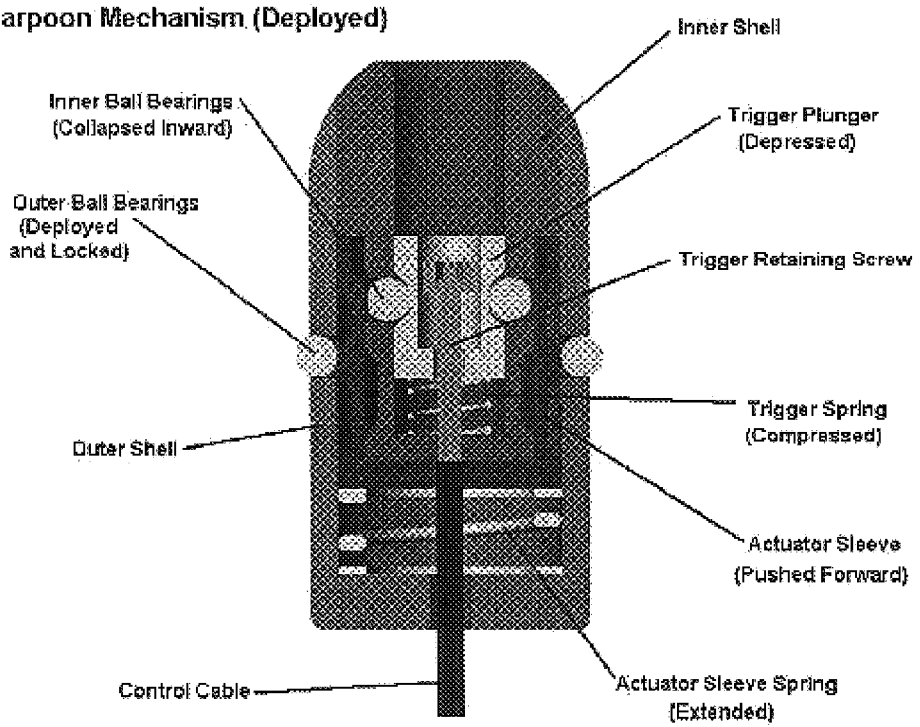
FIG. 3 illustrates the Harpoon Capture Mechanism (Deployed)

The operation of the Harpoon will now be described with particular reference to FIGS. 1–3.

The Components of the Harpoon

Docking Cable

The Harpoon is attached to a soft-dock cable, which is extended from the chaser side of the docking mechanism. This cable is comprised of a series of flexible load-bearing wire ropes that are fixed to the Harpoon base part and the attachment platform of the chaser half of the mechanism. Inside these load-bearing cables is a control cable that, when pulled back by a retraction mechanism located inside the chaser half of the mechanism, disengages and resets the Harpoon mechanism. Outside of the cable is a sheath consisting of a tightly wound extension spring. This sheath both protects the inner cable components from abrasion or contamination and adds a measure of stiffness to the docking cable, which allows it to push the Harpoon into contact with its target receptacle.

Outer Shell

The Harpoon's outer shell is the main structural component of the mechanism, which contains all of the moving parts of the device. The outer shell also holds a series of twelve ball bearings in tapered holes, preventing the bearings from falling out of the mechanism when it is in a deployed configuration. The outer shell's upper edge is threaded on the inside to accommodate the inner shell, and is rounded to prevent snagging on the target receptacle when it is being pushed into contact.

Inner Shell

The inner shell of the Harpoon is threaded to screw down into the outer shell, containing all of the interior components. The inner shell's upper aperture allows a pin in the target receptacle to slide inside the Harpoon mechanism, depressing the trigger plunger as the Harpoon is seated in the receptacle.

Trigger Plunger and Trigger Spring

The trigger plunger slides inside of the inner shell and is held in place by a retaining screw that can be adjusted for depth. A spring beneath the plunger holds it in an extended position forward. In this position, the lower circumferential surface of the plunger holds the inner ball bearings outward in their holes.

Inner Ball Bearings

The inner ball bearings are what prevent the actuator sleeve from sliding forward in the device until the trigger is depressed. Once this event occurs, the ball bearings are allowed to fall inward toward the trigger spring, clearing the way for the actuator sleeve to be pushed forward.

Actuator Sleeve and Actuator Spring

The actuator sleeve is the main functional component of the Harpoon system. As the trigger is depressed, the inner ball bearings allow it to slide forward. Its motion is due to the actuator spring at the bottom of the mechanism, which is held in compression while the device is armed. Pushing the actuator sleeve upward forces the outer ball bearings outward and locks them in place. The control cable is attached to the actuator sleeve. Retracting the control cable pulls the actuator sleeve back, resetting the device.

Outer Ball Bearings

The outer ball bearings hold the Harpoon in its target receptacle once the mechanism is in its deployed configuration. They are allowed to collapse inward again once the mechanism is reset.

Actuation of the Mechanism

The mechanism is nominally kept in the armed configuration. The outer ball bearings are allowed to move freely in and out of their deployed position, while the inner ball bearings are held out by the trigger plunger and prevent the actuator sleeve from sliding forward in its travel space. When the trigger is depressed against the trigger spring, the inner ball bearings are allowed to collapse inward against the trigger's narrower diameter section. This moves the inner ball bearings out of the way of the actuator sleeve, which is then propelled forward in its travel space by the actuator spring. The outer ball bearings are then forced outward by the angled surface on the outside of the actuator sleeve, then locked in place once the cylindrical surface behind that ramped surface lies beneath the bearings. The Harpoon mechanism is then in the deployed state.

Retracting the mechanism is a simple matter of pulling back on the control cable. This pulls the actuator sleeve back in its travel space, allowing the outer bearings to slide inward. Once they do this, the Harpoon is free to leave its receptacle, pulling it away from contact with the triggering pin and allowing the trigger plunger to snap back forward. This pushes the inner ball bearings outward again, locking them in the path of the actuator sleeve, and re-arming the mechanism.

Differences Between ASDS and the ARD System

To assist in appreciating the ways in which the instant invention distinguishes over the prior art, a comparison will be made between the ASDS and ARD system, as described in U.S. Pat. No. 5,364,046.

Capture Mechanism

Figure 4:
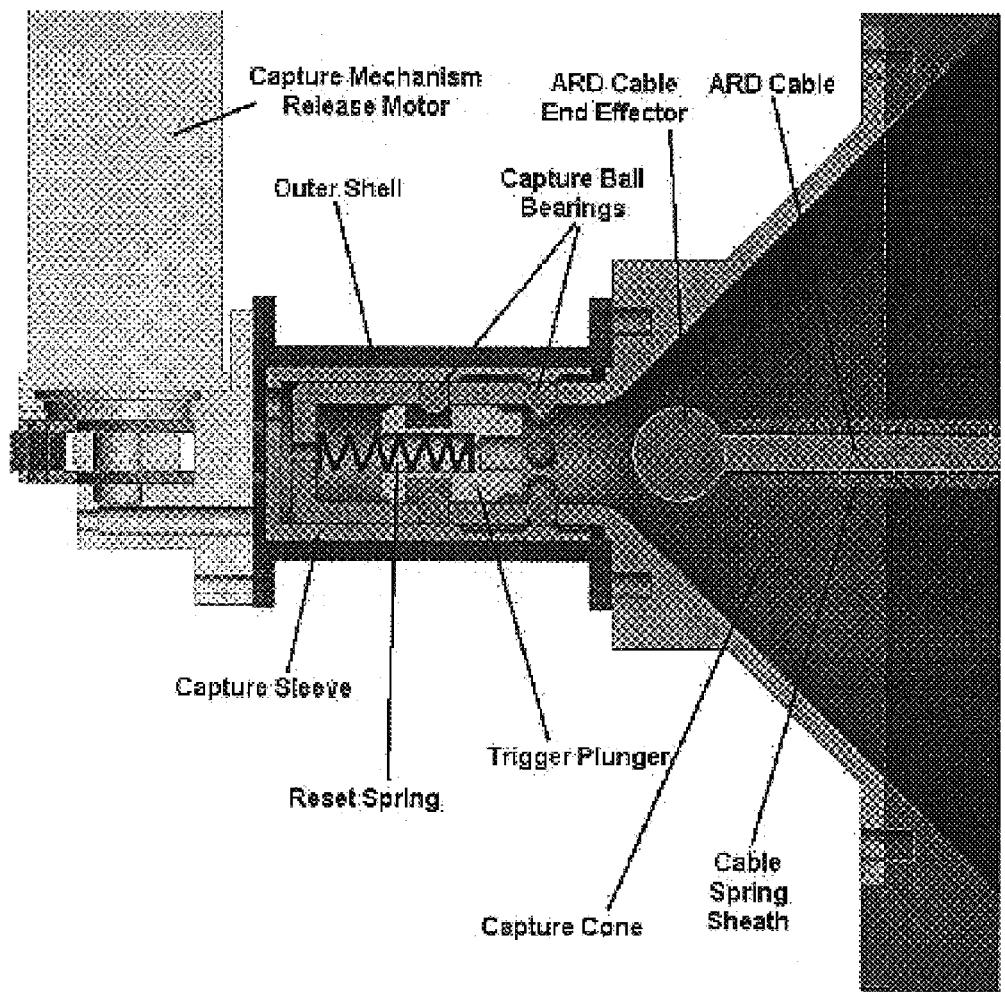
FIG. 4 illustrates the ARD Soft-Dock Capture Mechanism.

The ARD system, depicted in FIG. 4, utilizes an active latching receptacle on the target side and a passive brass sphere attached to a steel cable on the chaser side. As the cable and sphere are extended from the chase vehicle, they seat into the bottom of a cone on the target side, which captures the sphere with the ARD latch system. The main drawback of this design is that it requires active components on both the chaser side (cable and boom extension and retraction systems) and the target side (active latching and release systems) of the mechanism.

Figure 5:
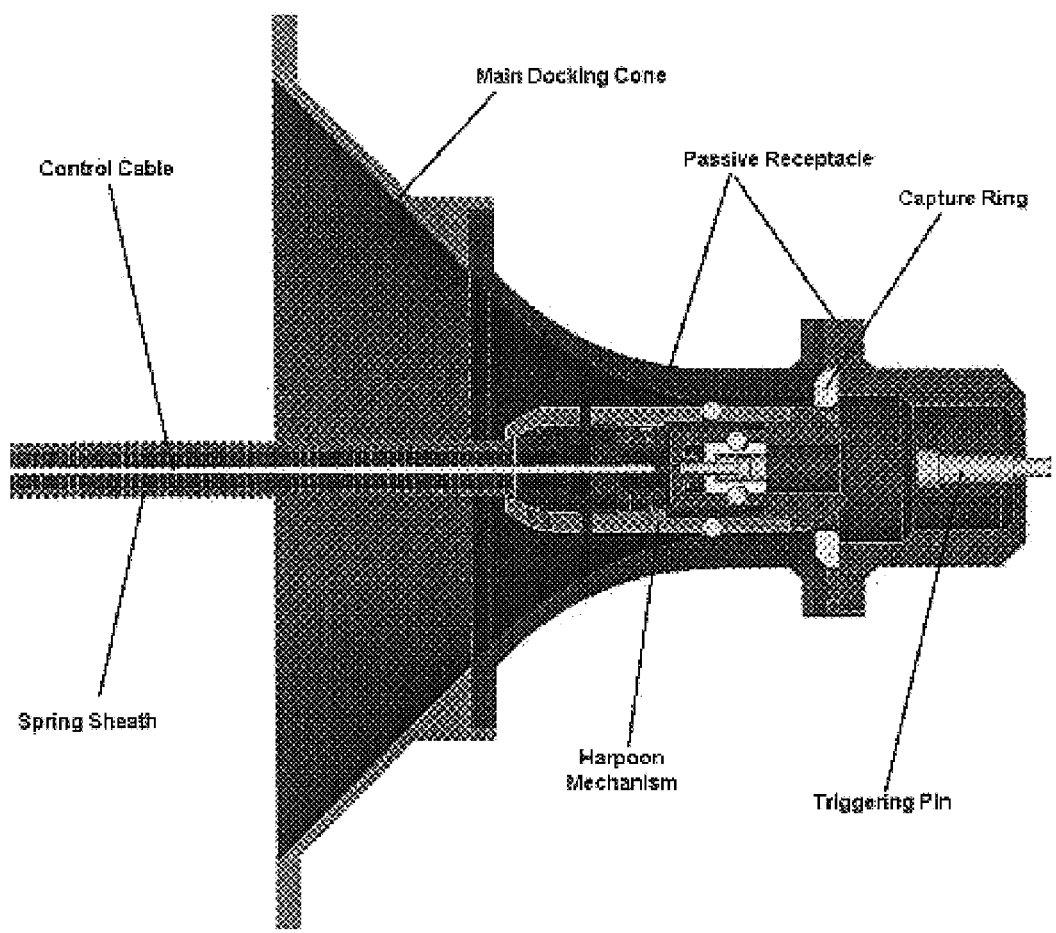
FIG. 5 illustrates the ASDS Soft-Dock Capture Mechanism.

This problem was addressed in the design of the ASDS system by moving the active latching components from the target side to the chaser side (see FIG. 5). An active latching end-effector is mounted on the soft-docking cable in place of the passive brass sphere, allowing the chaser side of the mechanism to carry out all the active processes of closing the distance to the target, entering the receptacle, latching in the receptacle, and retracting the cable to bring the mechanism halves together in a hard-dock.

Boom Extension Drive

Figure 6:
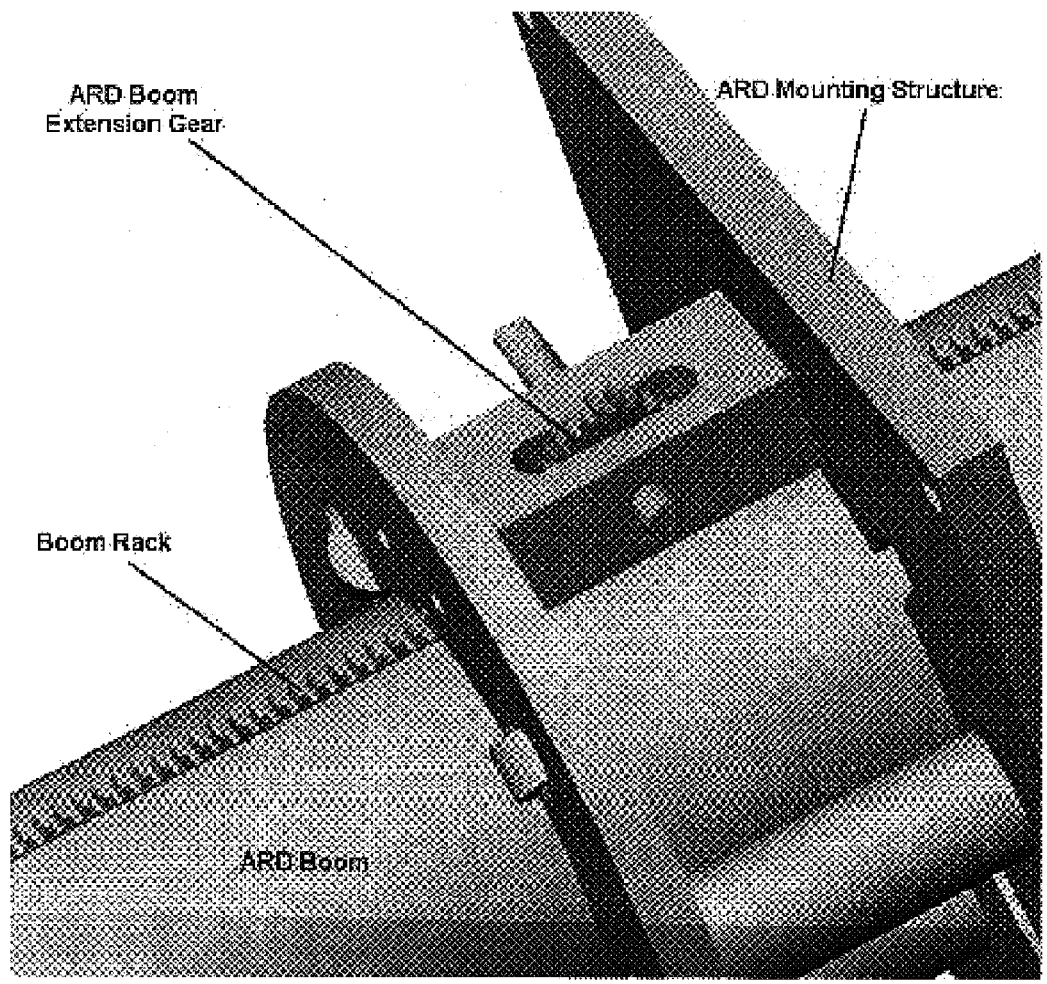
FIG. 6 illustrates the ARD Boom Extension System (Rack-and-Pinion)

The moving boom section of the ARD is driven by a rack-and-pinion gear system (see FIG. 6). The rack is attached to the boom body tube and runs the entire length of the boom. The pinion, driven by a geared-down motor, is held in contact with the rack to drive the boom in or out of the mounting structure. The main reason for this type of mechanism was that the ARD was designed to withstand a positive hard-docking impact and the geared motor system was intended to absorb this impact without damaging the structure or the spacecraft it was mounted on.

Figure 7:
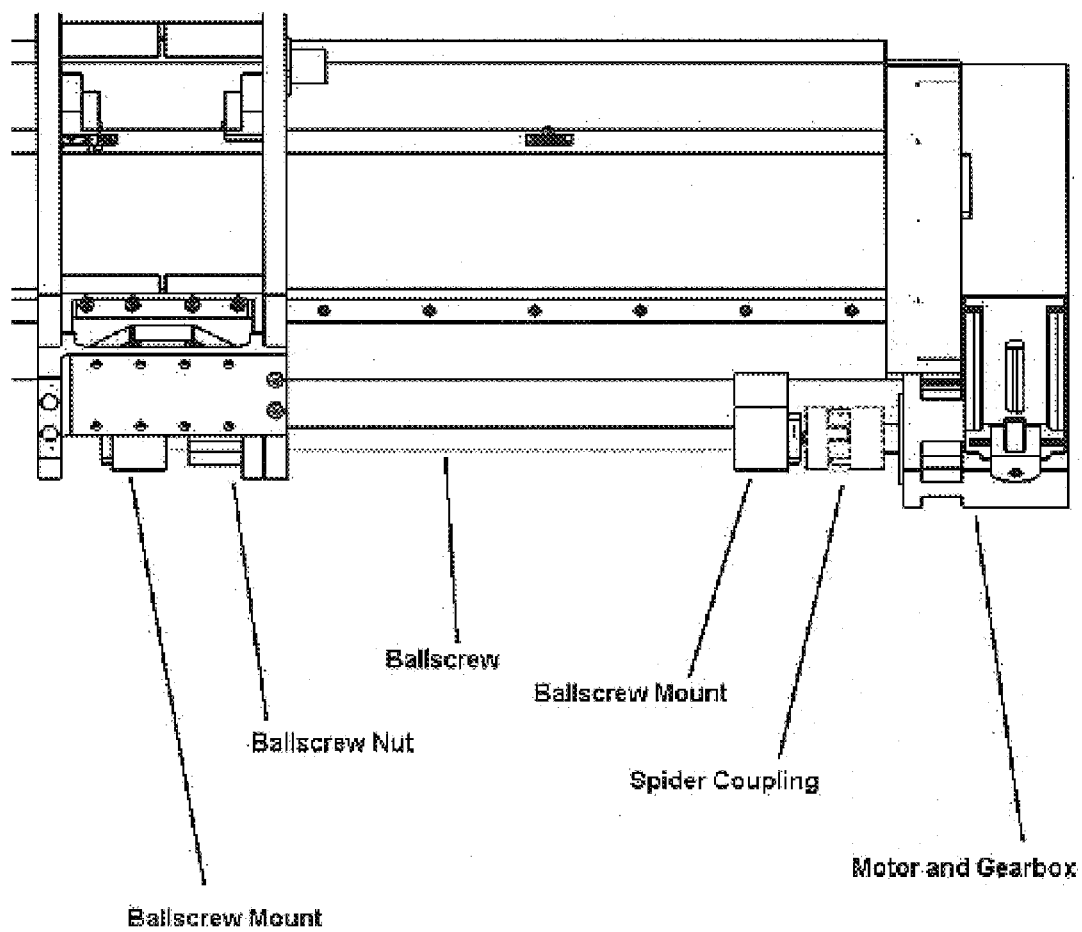
FIG. 7 illustrates the ASDS Boom Extension System (Ballscrew)

Since the focus of the ASDS mechanism was not impact resistance but, rather, soft-docking with minimal force imparted to either side, this gearing system was unnecessary and inefficient. To that end, it was replaced with a ballscrew and motor system that provided more extension and retraction force with a smaller motor due to fewer losses in the system and a greater mechanical advantage (see FIG. 7).

Cable Actuator System

Figure 8:
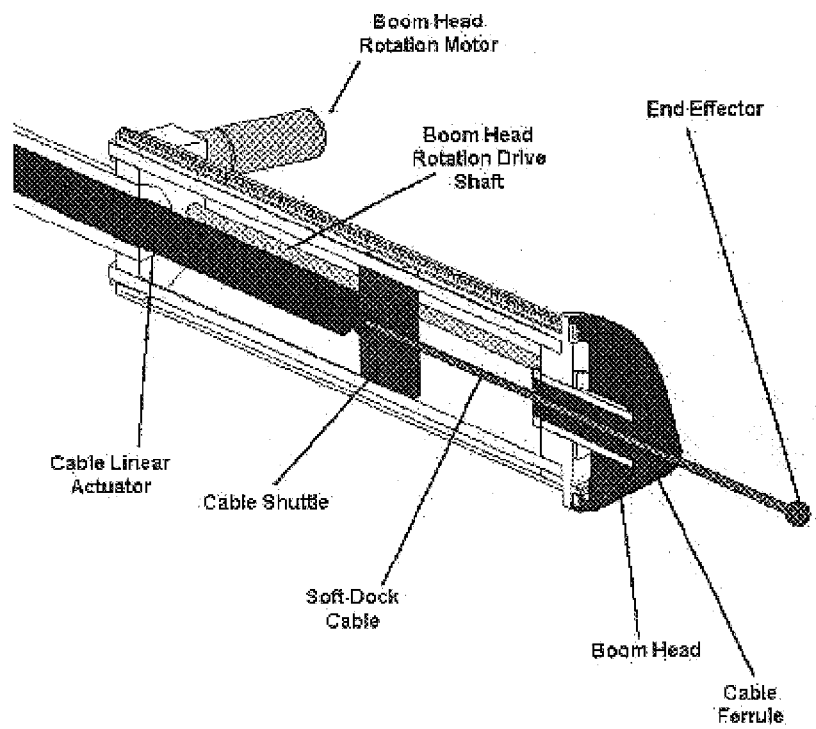
FIG. 8 illustrates the ARD Cable Extension System (Linear Actuator)
Figure 9:
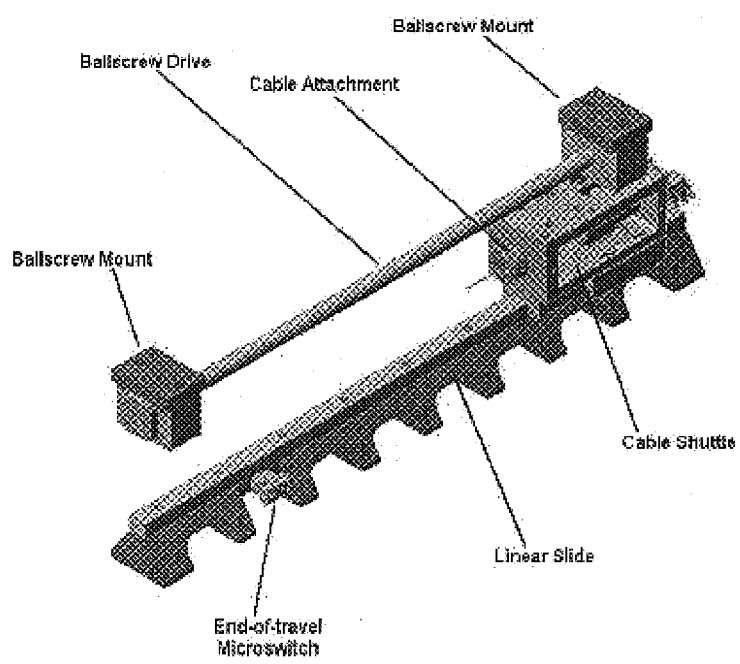
FIG. 9 illustrates the ASDS Cable Extension System (Ballscrew)
Figure 10:
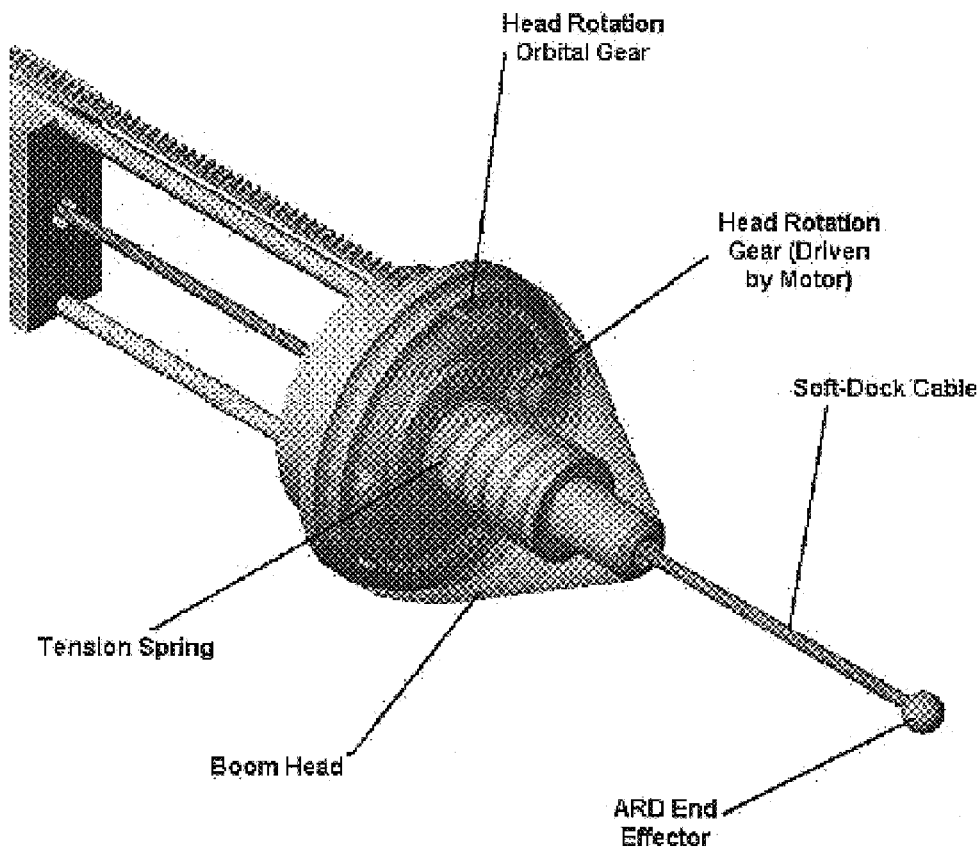
FIG. 10 illustrates the ARD Head Rotation Indexing System.

The ARD cable actuator is simply a standard linear actuator attached to the interior end of the soft-dock cable. Since this design is not space-rated it takes up a great deal of space (see FIG. 8), the ASDS mechanism was improved by using a ballscrew-driven cable actuator that could be placed almost entirely inside the main docking boom. A single ballscrew runs the length of the boom structure and is driven by a geared motor at the interior end of the boom. The cable itself is attached to a cable shuttle, which is mounted on a linear rail inside the boom to prevent the shuttle from turning with the ballscrew while allowing the shuttle to move axially inside the boom (see FIG. 9).

Cable End Effector

The cable end effector on ARD was a simple brass sphere on the end of the soft-dock cable. To switch the ASDS mechanism over to having all the active components on the case side, this was replaced with the active Harpoon mechanism (see FIGS. 1–3).

Mechanism Alignment System

Figure 13:
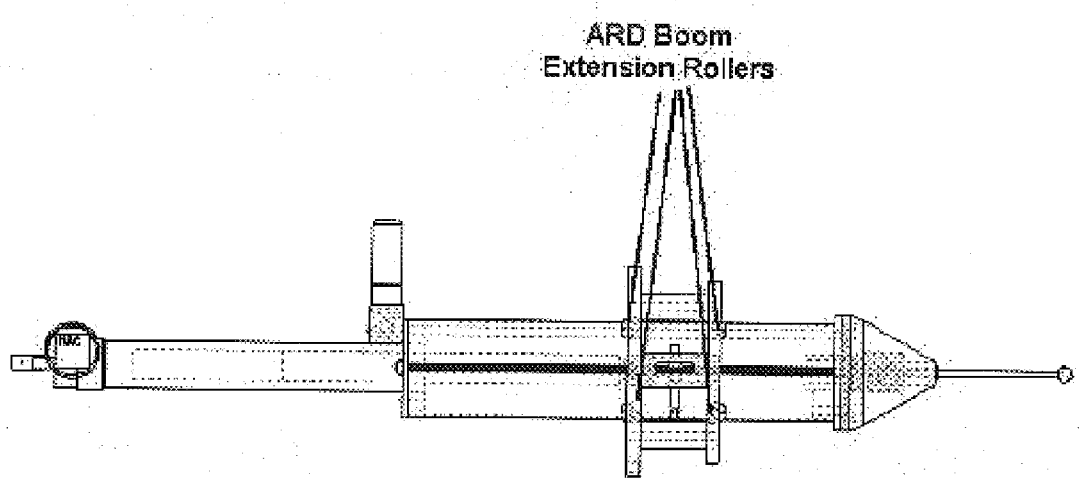
FIG. 13 illustrates the ARD Boom Glide Components.

The ARD mechanism achieves rotational alignment of the two systems after docking through the use of a rotating boom head actively driven by a motor mounted aft of the boom. Once the boom head makes hard contact with the target main cone, the boom head rotates to index the mechanism into proper rotational alignment (see FIGS. 11 and 13). This allowed head indexing to any rotational misalignment, ±180 degrees.

Figure 11:
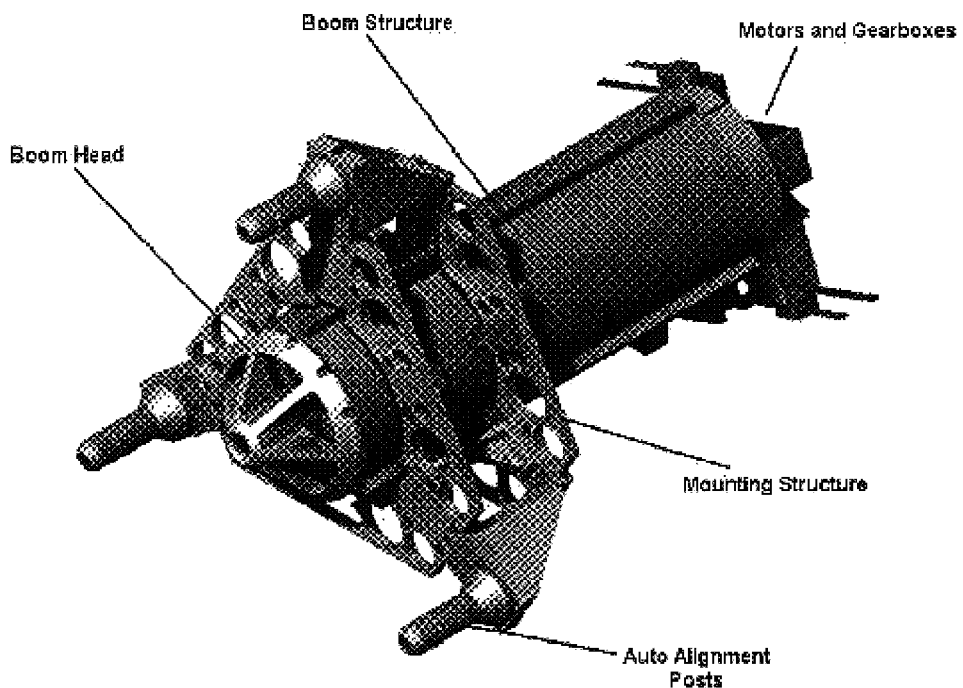
FIG. 11 illustrates the ASDS Chaser-Side Indexing System Components.
Figure 12:
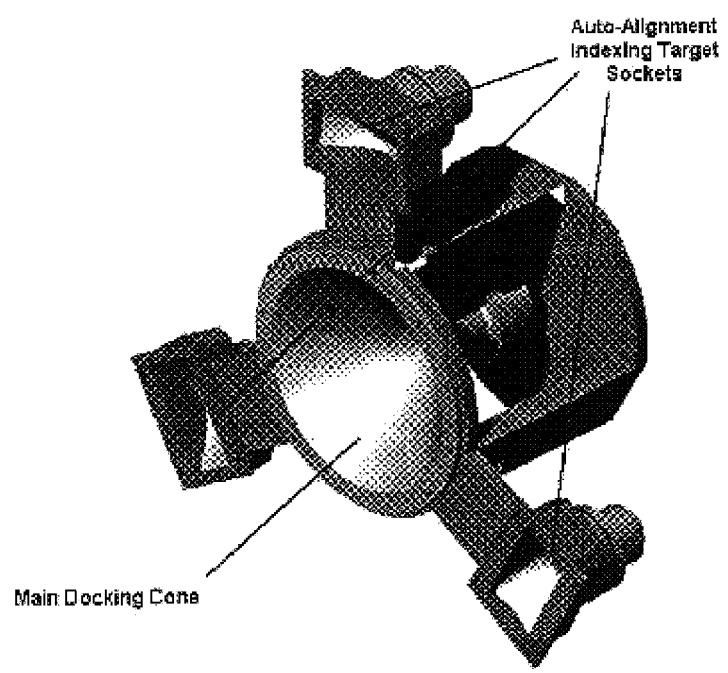
FIG. 12 illustrates the ASDS Target-Side Indexing System Components.

Since modern sensors and guidance, navigation and control (GN&C) algorithms are far more accurate at close range than similar systems during the time of the ARD's design, 180 degrees of alignment correction is no longer required. Therefore, in an effort to simplify the mechanism, the ASDS system instead uses a trio of guideposts that slide into matching receptacles on the target side to auto-align. While this system does not provide as great a correction range as the active indexed head on ARD, the larger range is no longer required and the current system is much simpler (FIGS. 11 and 12).

Boom Extension Glide Mechanism

The moving boom structure on the ARD mechanism was attached to the mounting plate by eight aluminum rollers that lay in direct contact with the outside skin of the boom structure. Due to the appearance of some surface galling on the ARD boom structure, later designs included a V-groove and track roller system, which is similar to the mechanism planned for orbit (see FIG. 13).

Figure 14:
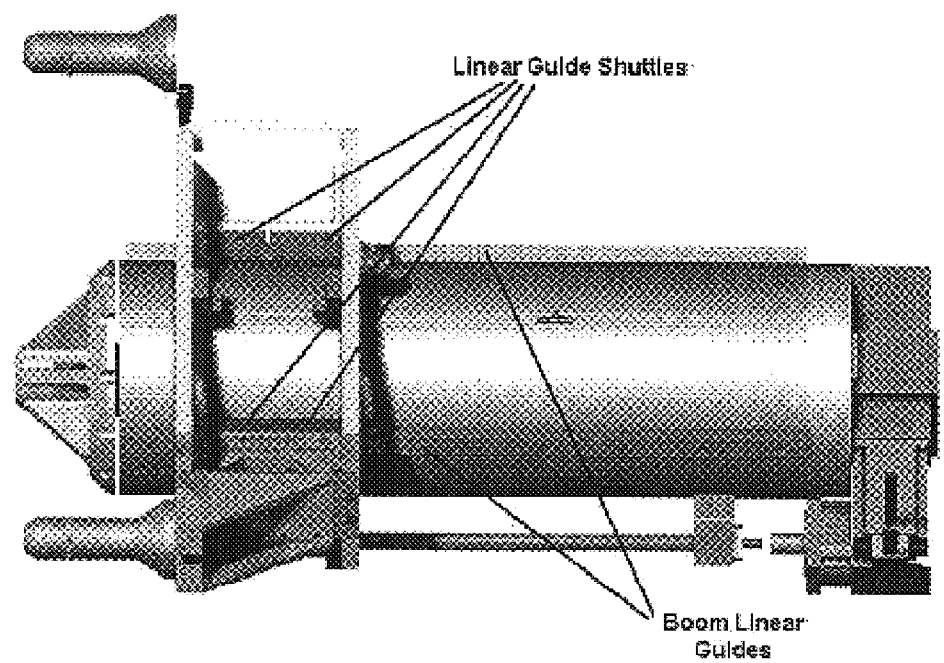
FIG. 14 illustrates the ASDS Boom Glide Components.

The ASDS mechanism used a series of linear ball-bearing glides and rails for rigidity of the system during testing. This was not intended to fly in orbit, as a space-rated version of these ball-bearing glides does not currently exist in a practical form for ASDS use (see FIG. 14).

We claim:

1. A system for docking a chase space vehicle to a target space vehicle having a receptacle, comprising:
   a control cable extending from the chase vehicle; and
   a harpoon mechanism coupled to the end of the control cable, the mechanism including:
   a) a deployed state wherein the mechanism is physically engaged within the receptacle, and
   b) a disengaged state achieved by a pull on the control cable, causing the mechanism to be released from the receptacle.

2. The system of claim 1, wherein the control cable is substantially flexible.

3. The system of claim 1, wherein the control cable is the only member coupling the chase and target vehicles in the deployed state.

4. The system of claim 1, wherein the harpoon mechanism further comprises a shell including the following:
   a spring-biased actuator;
   a spring-biased trigger;
   a set of inner ball bearings;
   a set of outer ball bearings; and
   when the trigger is depressed against the trigger spring, the inner ball bearings move to allow the actuator to move forward causing the outer ball bearings to engage with the receptacle in the deployed state; and
   when the cable is pulled, the outer ball bearings retract, allowing the harpoon mechanism to disengage with the receptacle and the inner ball bearings to hold the trigger in an armed state for further deployment.

* * * * *

UNITED STATES PATENT AND TRADEMARK OFFICE
CERTIFICATE OF CORRECTION

| | | |
|---|---|---|
| PATENT NO. | : 6,742,745 B2 | Page 1 of 1 |
| APPLICATION NO. | : 10/286192 | |
| DATED | : June 1, 2004 | |
| INVENTOR(S) | : Peter Tchoryk, Jr. et al. | |

It is certified that error appears in the above-identified patent and that said Letters Patent is hereby corrected as shown below:

Title Page; item (75);
On the front page, the following changes should be made to the Inventors:
   inventor "Pete Tchoryk" should be changed to --Peter Tchoryk, Jr.--;
   inventor "Jane Pavlich" should be changed to --Jane Camile Pavlich--; and
   inventor "Anthony B. Hays, Howell, MI" should be changed to --Anthony Beckman Hays, Jackson, MI--.

item (75);
On the front page, the following inventor should be added:
  --Gregory Joseph Wassick, Petersburg, MI--.

The following statement regarding federally sponsored research or development should be added in Column 1 before line 10:

--STATEMENT REGARDING FEDERALLY SPONSORED RESEARCH OR DEVELOPMENT
This invention was made with Government support under Contract Nos. DAAH01-00-C-R012 and DAAH01-01-C-R015 awarded by the U.S. Army Aviation and Missile Command, with funding from the Defense Advanced Research Projects Agency (DARPA). This invention was also made with Government support under Contract No. F29601-02-C-0007 awarded by the U.S. Air Force. The Government has certain rights in this invention.--

Signed and Sealed this

Nineteenth Day of May, 2009

JOHN DOLL
*Acting Director of the United States Patent and Trademark Office*